US010154625B2

(12) United States Patent
Walker

(10) Patent No.: US 10,154,625 B2
(45) Date of Patent: Dec. 18, 2018

(54) ADJUSTABLE AUGER HOOD FOR A HEADER OF AN AGRICULTURAL HARVESTER

(71) Applicant: CNH Industrial America LLC, New Holland, PA (US)

(72) Inventor: Eric Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 74 days.

(21) Appl. No.: 15/274,189

(22) Filed: Sep. 23, 2016

(65) Prior Publication Data

US 2018/0084721 A1 Mar. 29, 2018

(51) Int. Cl.
| A01D 41/127 | (2006.01) |
| A01D 41/06 | (2006.01) |
| A01D 61/00 | (2006.01) |
| A01D 41/12 | (2006.01) |
| A01D 41/14 | (2006.01) |
| A01D 45/02 | (2006.01) |

(52) U.S. Cl.
CPC ......... *A01D 41/1274* (2013.01); *A01D 41/06* (2013.01); *A01D 41/12* (2013.01); *A01D 41/14* (2013.01); *A01D 45/021* (2013.01); *A01D 61/002* (2013.01)

(58) Field of Classification Search
CPC .. A01D 41/06; A01D 41/127; A01D 41/1271; A01D 41/141; A01D 45/021; A01D 34/006
See application file for complete search history.

(56) References Cited

U.S. PATENT DOCUMENTS

| 2,774,210 | A | 12/1956 | Reuben |
| 3,132,459 | A | 5/1964 | Grillot |
| 3,245,515 | A | 4/1966 | Rambo et al. |
| 3,568,863 | A | 3/1971 | Mittelbach et al. |
| 3,759,021 | A | 9/1973 | Schreiner et al. |
| 3,808,783 | A | 5/1974 | Sutherland et al. |
| 3,886,675 | A | 6/1975 | Maisonneuve et al. |
| 4,720,962 | A | 1/1988 | Klinner |
| 4,896,486 | A * | 1/1990 | Lundahl ................. A01D 41/06 56/10.2 E |
| 5,111,645 | A * | 5/1992 | Klinner ................. A01D 41/06 56/364 |
| 5,299,413 | A | 4/1994 | Gale |
| 5,526,920 | A | 6/1996 | Ellsworth |
| 5,557,912 | A | 9/1996 | Voss et al. |
| 5,960,618 | A | 10/1999 | Kerber |
| 6,901,730 | B1 | 6/2005 | Buresch et al. |
| 7,716,904 | B2 | 5/2010 | Diederich, Jr. et al. |

(Continued)

FOREIGN PATENT DOCUMENTS

JP 2012065615 4/2012

*Primary Examiner* — Arpad Fabian-Kovacs
(74) *Attorney, Agent, or Firm* — Peter K. Zacharias

(57) ABSTRACT

A header for a combine harvester, the header including an auger for directing the movement of harvested grain toward a feederhouse of the combine harvester and an adjustable hood positioned above the auger and moveable between a lowered position, a raised position and an intermediate position between the lowered and raised positions. The adjustable hood includes a pivot mechanism and an actuator for moving the adjustable hood between the lowered, raised and intermediate position.

20 Claims, 7 Drawing Sheets

(56) References Cited

U.S. PATENT DOCUMENTS

| | | | |
|---|---|---|---|
| 9,301,445 B1 | 4/2016 | Seeliger | |
| 9,322,629 B2* | 4/2016 | Sauder | A01D 45/021 |
| 2013/0111869 A1 | 5/2013 | Koch et al. | |
| 2014/0298769 A1 | 10/2014 | Walker et al. | |
| 2015/0011274 A1 | 1/2015 | Murray et al. | |
| 2015/0245556 A1 | 9/2015 | Prickel et al. | |
| 2016/0014960 A1 | 1/2016 | Meagher et al. | |
| 2016/0106038 A1* | 4/2016 | Boyd | A01D 41/141 56/10.4 |
| 2016/0330907 A1* | 11/2016 | Anderson | A01D 41/1278 |
| 2017/0332551 A1* | 11/2017 | Todd | A01D 41/127 |
| 2017/0339827 A1* | 11/2017 | Anderson | A01D 41/06 |

* cited by examiner

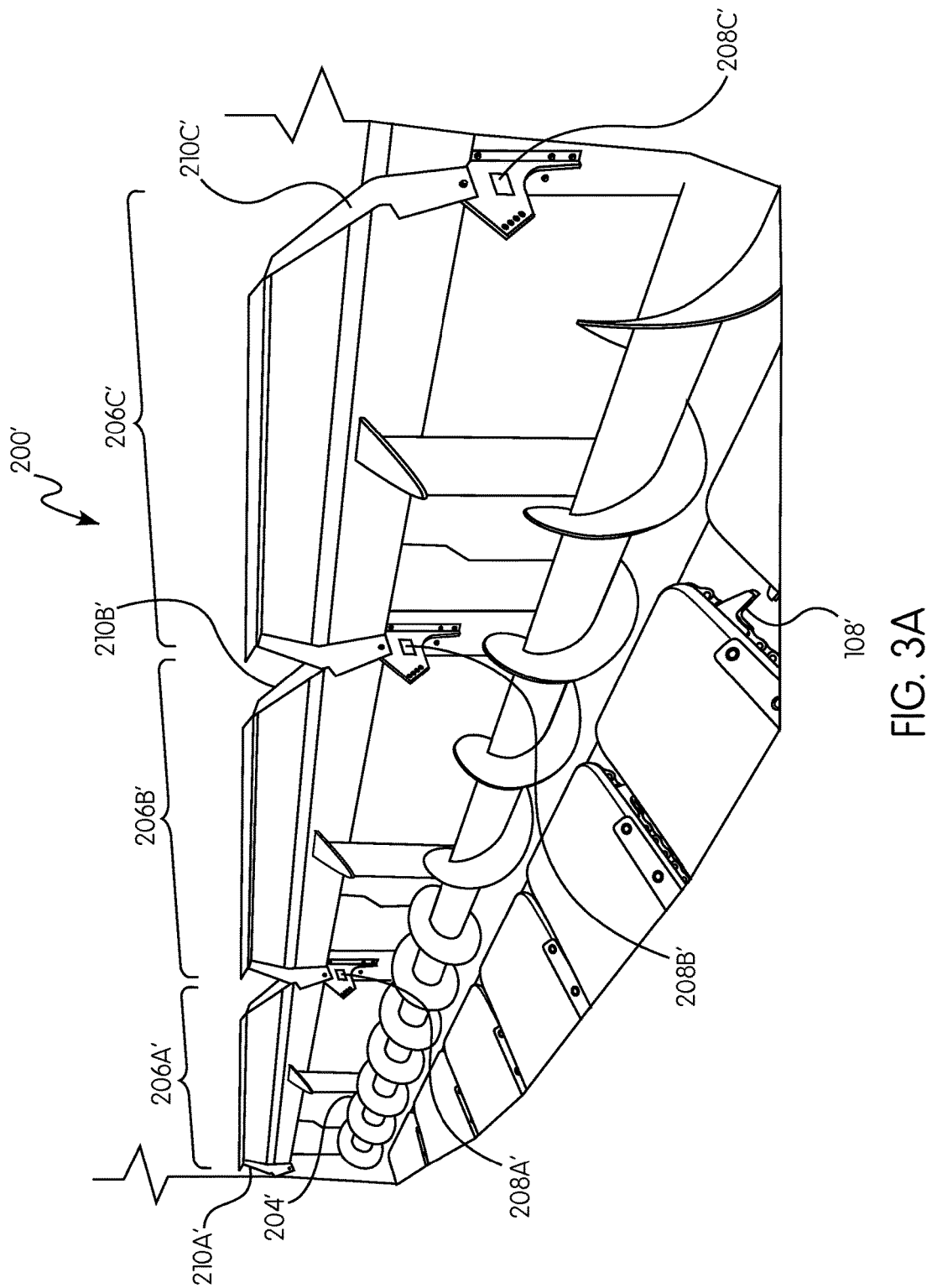

ADJUSTABLE AUGER HOOD FOR A HEADER OF AN AGRICULTURAL HARVESTER

FIELD OF THE INVENTION

The present invention relates generally to a header for use with combine harvesters. In particular, the present invention relates to an adjustable auger hood for the header that assists with grain retention and crop material flow into the header during harvesting operations.

BACKGROUND OF THE INVENTION

An agricultural combine is a machine used to harvest a variety of crops from a field. During a harvesting operation, a corn header at the front of the combine cuts ripened crop from the field. Row dividers of a corn header (i.e., a type of header) direct rows of corn stalks to ear separation chambers or stripping plates and then to an auger. The auger advances the crop towards the vehicle centerline. A feederhouse transfers the crop material into the combine by way of a conveyor such as an elevator assembly. Processing machinery such as threshing and separating assemblies within the combine further separate, clean and/or transfer the grain for storage.

During harvesting, the moisture of the crops in the field may change throughout a harvesting session because of dew formation and evaporation, field conditions (e.g., proximity to water, elevation of the field, time elapsed since prior irrigation), weather, or any combination thereof. Different moisture levels can change the manner in which grain passes through the subassemblies of the harvester. Dry grain may be more prone to fly away, and dry leaves may be more likely to break off and collect in parts of the harvester. Wet grain may be more prone to accreting and build-up in parts of the harvester. Wet grain plants may also be tougher and more likely to suffer grain (e.g., corn kernel) loss during harvesting. This situation is disadvantageous because, if allowed to accumulate, such material can cause the combine harvester to overload and prevent harvesting operations.

Therefore, there is still a need for a header that can reduce grain loss and allow for harvesting in any condition without requiring the operator to manually adjust the header e.g., the auger hood, to optimize header performance. The present invention addresses the foregoing issues of conventional headers.

BRIEF SUMMARY OF THE INVENTION

In accordance with an exemplary embodiment of the present invention, there is provided a header of a combine harvester, the header comprising an auger for directing the movement of harvested grain toward a feederhouse of the combine harvester and an adjustable hood positioned above the auger and moveable between a lowered position, a raised position and an intermediate position between the lowered and raised positions. The adjustable hood includes a pivot mechanism and an actuator for moving the adjustable hood between the lowered, raised and intermediate positions.

In accordance with another exemplary embodiment of the present invention, there is provided a header of a combine harvester, the header comprising a frame for attaching to the combine harvester, an auger extending widthwise of the frame, and a hood assembly connected to the frame. The hood assembly includes a hood extending above the auger and movably connected to the frame and a drive mechanism for moving the hood between a first position and a second position.

In accordance with yet another exemplary embodiment of the present invention, there is provided a combine harvester, the combine harvester comprising a control unit and a header. The header comprises a frame for attaching to the harvester, an auger extending widthwise of the frame, and a hood assembly connected to the frame. The hood assembly includes a hood extending over the auger and a drive mechanism for moving the hood between a first position and a second position. The hood assembly is in communication with the control unit for remotely controlling a position of the hood.

In accordance with another exemplary embodiment of the present invention, there is provided an adjustable auger hood of a header for a combine harvester. Specifically, the adjustable auger hood hydraulically or electrically adjusts a position of a hood to assist with grain retention and crop material flow in the header, e.g., a corn header.

In accordance with another exemplary embodiment of the present invention, an adjustable hood of a combine harvester includes a hydraulic or electric actuator connected to a hood to raise and lower the hood from a cab of the combine harvester using a reel raise or lower button or a shift function button. For example, the actuator may be attached to the hood. The hood may be hinged at a rear portion. The actuator raises or lowers the hood by command of an operator in the cab using the reel raise or lower button. The hood can be lowered beyond a current lowest position and opened to a current highest position. Alternatively, an air, electric, or hydraulic actuator or motor can be used to achieve the same purpose.

The resultant advantages of the exemplary embodiments of the present invention include lower grain loss and adding grain saving value to a header. Such an adjustable hood in accordance with an exemplary embodiment of the present invention reduces grain loss and reduces danger to an operator during harvesting operations.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently desired. It should be understood, however, that the invention is not limited to the precise arrangements and instrumentalities shown.

In the drawings:

FIG. 3A is a partial perspective view of an adjustable auger hood in accordance with another exemplary embodiment of the present invention;

DETAILED DESCRIPTION OF THE INVENTION

Figure 1:
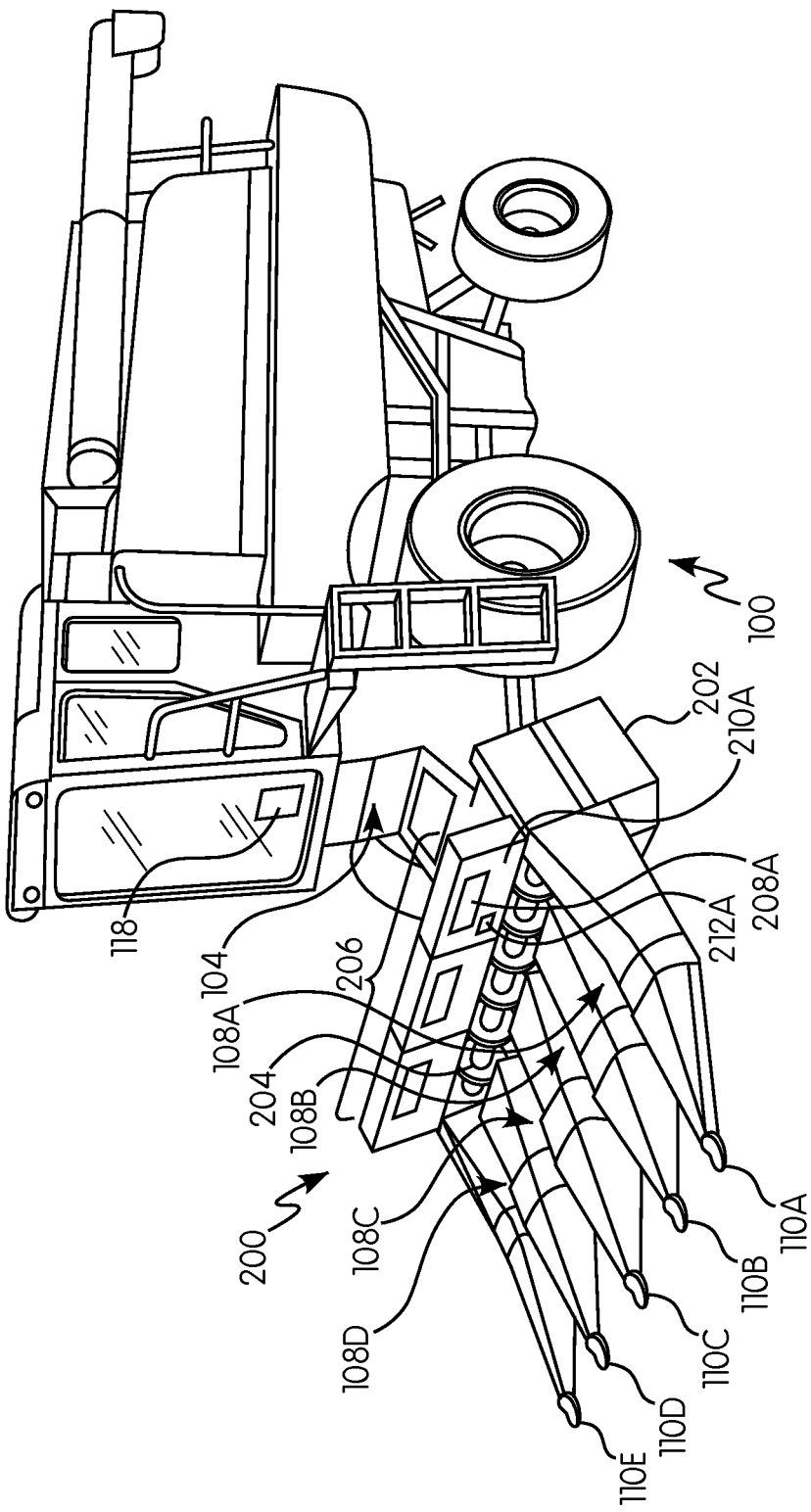
FIG. 1 is a perspective view of a combine harvester in accordance with an exemplary embodiment of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Figure 2:
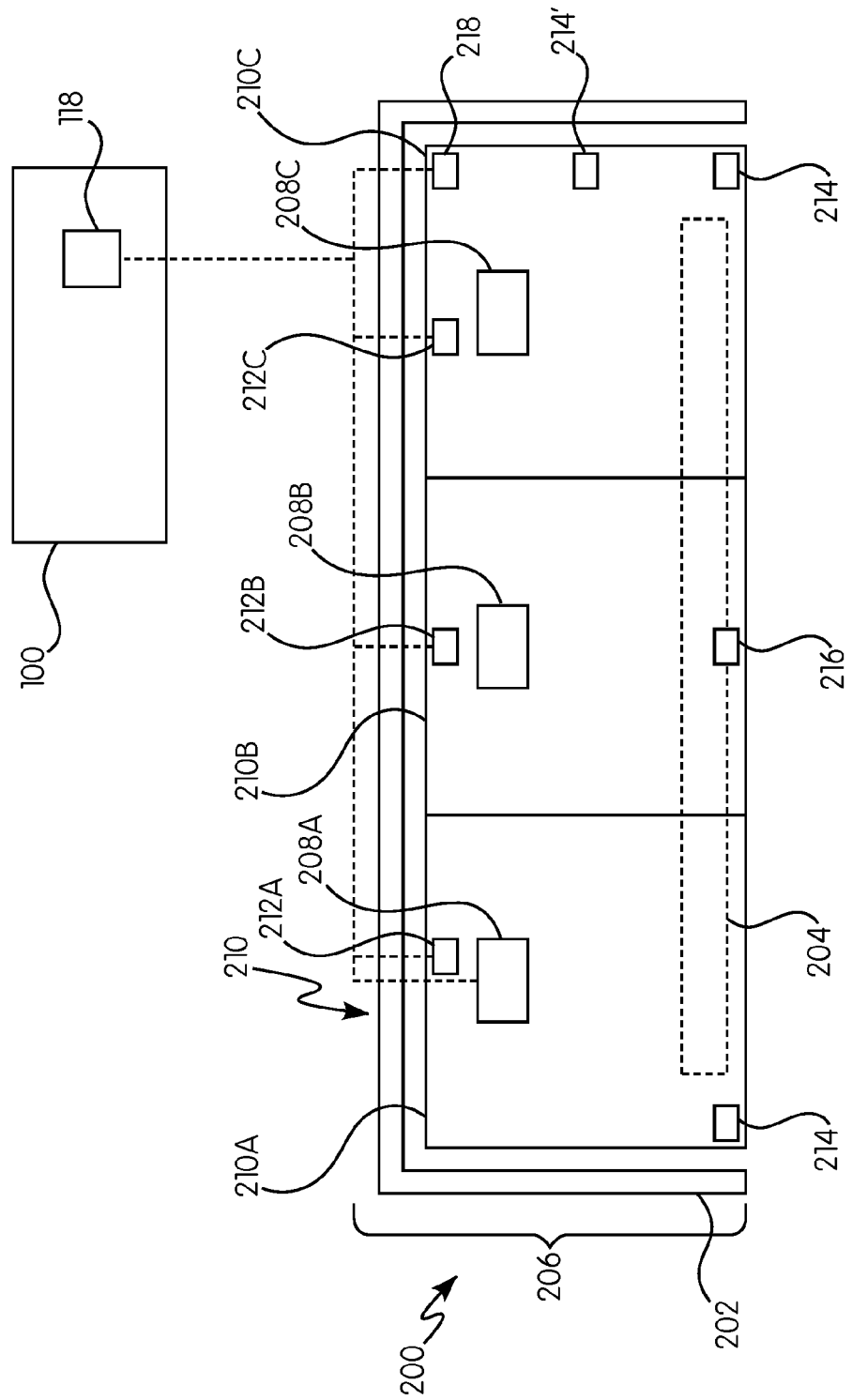
FIG. 2 is a schematic view of a header of a combine harvester in accordance with an exemplary embodiment of the present invention.

Referring now to the drawings wherein exemplary embodiments of the present invention are shown, FIGS. 1 and 2 illustrate an agricultural harvester 100 in accordance with an exemplary embodiment of the present invention. The agricultural harvester e.g., a combine harvester 100, includes a header 200 having a frame 202 for mounting to a forward end of the combine harvester 100, an auger 204 extending lengthwise across the frame 202, and a hood assembly 206 connected to the frame 202. The combine harvester 100 can further include a control unit 118.

The header can be a corn header, and the corn header will be used herein to describe an exemplary embodiment of the present invention. As shown in FIG. 1, corn headers include a plurality of row units 108A-D and row dividers 110A-E operatively connected to the combine harvester 100 for harvesting crop such as corn and feeding the crop to a feederhouse 104 of the harvester for further downstream processing.

The auger 204 extends widthwise of the header frame 202 and directs movement of harvested grain toward the feederhouse 104 of the combine harvester 100. While FIGS. 1 and 2 illustrate an auger, alternative conveying mechanisms can be used e.g., a conveyor belt and the like.

In accordance with an exemplary embodiment of the present invention, the hood assembly 206 is configured as best shown e.g., in FIG. 2. The hood assembly 206 is connected to the frame 202 of the header and includes a hood 210 (shown collectively as hood segments 210A-C) extending above the auger 204 and a drive mechanism 208A for moving the hood 210 between various positions e.g., a first position and a second position.

The hood 210 is generally configured as having a substantially rectangular plan view profile. However, the hood 210 can alternatively be configured as a planar hood that substantially covers the auger, or any other shape suitable for its intended purpose e.g., parallelogram, circular and the like. The hood 210 is positioned above the auger 204 and movably connected to the frame 202. Specifically, the hood 210 is sized and shaped sufficiently to extend above and cover the auger 204 extending widthwise of the frame 202.

Figure 2A:
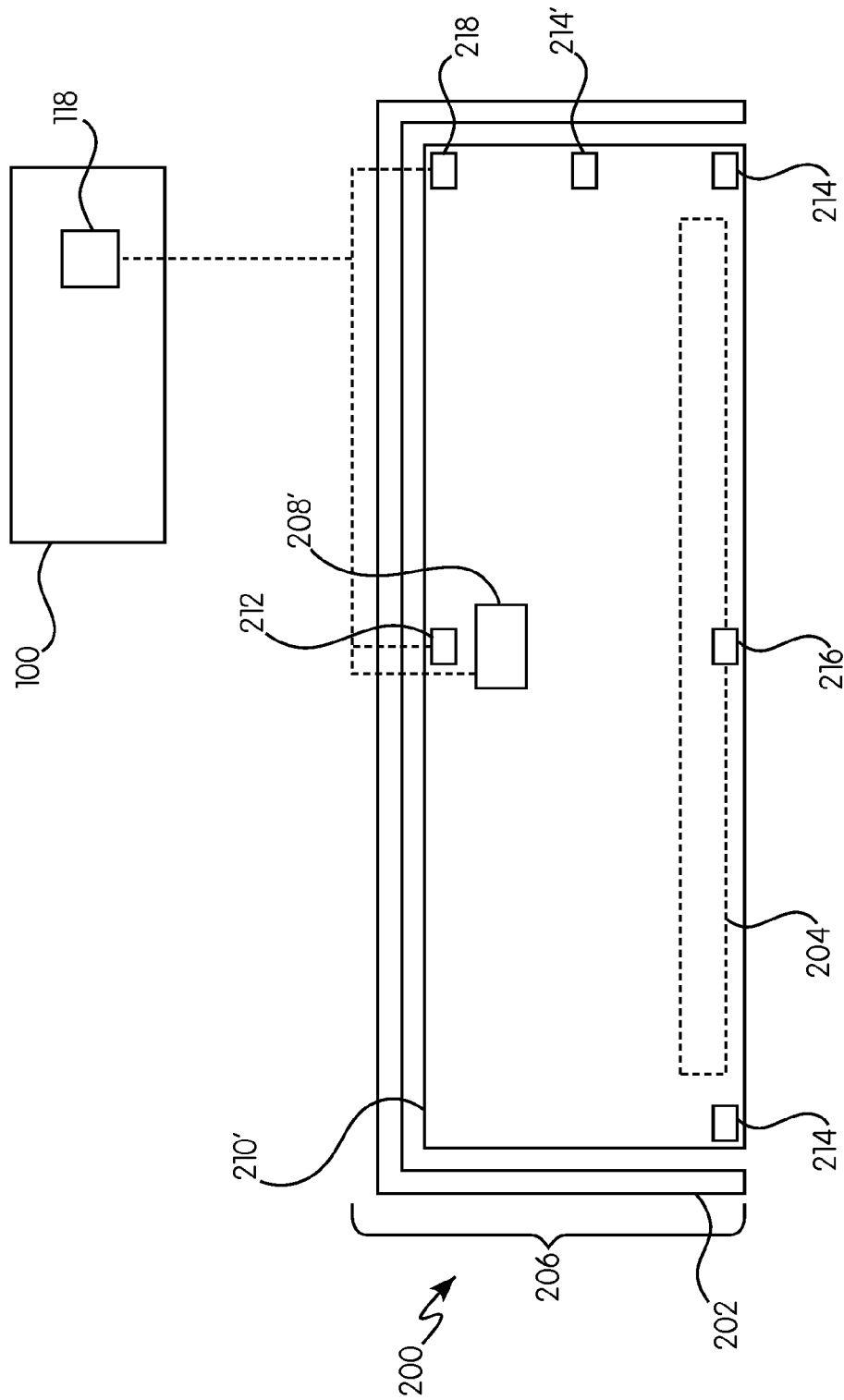
FIG. 2A is a schematic view of a header of a combine harvester in accordance with another exemplary embodiment of the present invention.

The hood 210 can be of unitary construction (as shown in FIG. 2A, in which the hood is generally designated as 210'), however, as shown in FIG. 2, the hood 210 is desirably formed from a plurality of hood segments 210A, 2106, 210C. Specifically, the hood 210 includes a plurality of hood segments 210A, 210B, 210C each independently and operatively connected to a respective drive mechanism 208A, 208B, 208C. For purposes of illustration, hood segment 210A is shown and described with drive mechanism 208A. It is to be understood, however, that each hood segment 210A, 210B, 210C can have a respective drive mechanism 208A, 208B, 208C. Each of the plurality of hood segments 210A, 210B, 210C is independently positionable relative to each other, and each may operate similarly to how the hood segment 210A is described herein as operating. In FIG. 2A, the hood 210' is shown with a single drive mechanism 208'.

The drive mechanism 208A is operatively connected to the hood segment 210A for moving the hood segment 210A between the first position and the second position. The drive mechanism 208A is advantageously positioned about a lateral side of the hood assembly 206. Alternatively, the drive mechanism 208A may be positioned adjacent a lateral side of the frame 202. Desirably, the drive mechanism is configured as an actuator or motor, but optionally can be a piston or cylinder type actuator or an electronic, pneumatic or hydraulic device and the like. The drive mechanism 208A can alternatively be configured as any other drive mechanism suitable for its intended purpose of moving the hood segment between a plurality of positions.

Alternatively expressed, the hood assembly 206 can be viewed as an adjustable hood segment 210A as best shown e.g., in FIG. 2. The adjustable hood segment 210A is positioned above the auger 204 and moveable between a lowered position, a raised position and an intermediate position between the lowered and raised positions. The adjustable hood segment 210A includes a pivot mechanism 212A and the drive mechanism 208A for moving the adjustable hood segment 210A between the lowered, raised and intermediate positions. The drive mechanism 208A can be an actuator.

The mounting element or pivot mechanism 212A is mounted to header 200 adjacent to frame 202, for pivotably moving the adjustable hood segment 210A upwardly and downwardly between the lowered, raised and intermediate positions. The pivot mechanism 212A can be mounted at any convenient location on header 200, so as to be pivotable between the lowered, raised and intermediate positions. For example, the adjustable hood segment 210A can be lowered by pivot mechanism 212A to hold the adjustable hood segment 210A in a selected position for harvesting operations. With the pivot mechanism 212A, the adjustable hood segment 210A can be adjusted accordingly during harvesting operations. Specifically, the height of the adjustable hood segment 210A is adjusted as desired or required for various row spacing, crop heights and other conditions, as well as for optimizing effectiveness, and can be pivoted to a substantially raised position when use is not desired or required.

The adjustable hood 210 can be of unitary construction (as shown in FIG. 2A, in which the adjustable hood is generally designated as 210'), however, as shown in FIG. 2, the adjustable hood 210 is desirably formed from a plurality of adjustable hood segments 210A, 210B, 210C. Specifically, the adjustable hood 210 includes a plurality of adjustable hood segments 210A, 210B, 210C each independently and operatively connected to a respective pivot mechanism 212A, 212B, 212C and a respective actuator 208A, 208B, 208C for adjustment of each adjustable hood segment 210A, 210B, 210C. For purposes of illustration, adjustable hood segment 210A is shown and described with pivot mechanism 212A and actuator 208A. It is to be understood, however, that each adjustable hood segment 210A, 210B, 210C has a respective pivot mechanism 212A, 212B, 212C and actuator 208A, 208B, 208C. Each of the plurality of adjustable hood segments 210A, 210B, 210C is independently positionable relative to each other, and each may operate similarly to how the hood segment 210A is described herein as operating. In FIG. 2A, the adjustable hood 210' is shown with pivot mechanism 212 and actuator 208'. The adjustable hood 210' may operate similarly to how the adjustable hood segment 210A is described herein as operating.

Referring back to FIG. 2, the header 200 advantageously includes a plurality of sensors 214 positioned about various locations of the header. Although the header 200 as shown is configured to have sensors 214 along lateral ends of the header 200, additional sensors may be placed at additional locations along the width of the header e.g., adjacent the auger. The sensors 214 are operatively in communication with the control unit 118 of the combine harvester, as further discussed below.

The hood segment 210A can be configured to automatically move between a plurality of positions based on feedback from the sensors 214. Typically, moisture levels of crop material may affect the accretions in the combine harvester 100. One or more sensors 214 may sense moisture at various locations of the header, thereby enabling the operator to automatically adjust the hood segment 210A based in part on feedback signals from one or more sensors on the header. For example, the plurality of sensors enable the operator to determine if conditions of the crop are favorable for accretions (e.g., too dry, too moist, high sap content). The moisture measurement is not limited to the arrangement shown and may include any known arrangement for measuring moisture of crop material.

The moisture levels may vary throughout the day. An optimal position of the hood, e.g. hood segments, can change several times in a single harvesting session. For example, during the early part of the day, dew accumulates on stalks causing the crop material to be tougher. Additionally, there is very little material other than grain (MOG) coming into the header. Because the plant material is tough, the corn shatters and loose kernels are easily lost resulting in higher losses of grain. Without the hood, there is additional kernel loss. To optimize harvesting, the hood is desirably positioned as low as possible to keep loose kernels and grain within the header.

During the middle of the afternoon, less moisture accumulates on the stalks resulting in dry crops and ideal harvesting conditions. The upper portions of stalks are more brittle and more plant material, e.g. dry leaf buildup, enters the auger. The plant material entering the header includes large amounts of fluff, i.e., fine particles of ground up stalks. Although the fluff and other plant material cause buildup in the header, fluff is desirable because it carries loose kernels. If the hood is in the lowered position, less fluff is able to enter the header. Therefore, raising the hood allows more fluff to enter the header. Thus, to optimize harvesting, the hood is desirably positioned as high as possible to allow more fluff, thereby reducing grain loss during harvesting.

In the late afternoon and evening, moisture from the ground accumulates on the stalks. Similar to the early part of the day, the plants get tougher and there is a potential for higher losses of grain and loose kernels. To optimize harvesting, the hood is desirably positioned as low as possible to reduce losses. As discussed above, the drive mechanism allows the hood to be adjusted e.g., from the cab, multiple times during a single harvesting session.

In sum, during the morning and evening, moisture accumulates on the stalk and as a result the plant is tougher. Because the plant is tougher, the hood is desirably positioned as low as possible to prevent grain loss and retain kernels in the header. In contrast, less moisture accumulates during the middle of the day and plants are more brittle. Therefore, more plant material in the header, e.g. large amounts of fluff, is encountered. As such, the hood is desirably positioned as high as possible to allow the increased fluff to enter the header, thereby reducing kernel loss.

In general, moisture levels and field humidity are high in the mornings leading to tougher stalk conditions which can cause an increase in shatter loss and ear bounce loss. Depending on climate condition, moisture levels and field humidity decrease in the middle of the day, thereby reducing shatter loss and ear bounce loss, but increasing leaf stripping and conveying loss. In the evening hours, moisture levels and field humidity increase again causing shatter loss and ear bounce loss. The severity of each loss condition is dependent on the variety of corn. For example, some varieties of corn have higher shatter loss and others have higher ear bounce loss, and still other varieties of corn have a combination of shatter loss and ear bounce loss.

In accordance with another exemplary embodiment of the present invention, the sensors 214 are configured as optical sensors 214' that sense changes in optical properties (e.g., color, brightness, emissivity, reflectivity, optical obstruction of sensor) of components within the harvester that are proximate to the one or more optical sensors. For example, the optical sensor may sense an accretion by detecting a change in color, brightness, reflectivity or emissivity of a surface of the harvester component proximate the optical sensor. Therefore, the optical sensors can be indicative of moisture and toughness of crop material as well as sunlight during harvesting operations. Such sensors can be used in combination with moisture sensors or alone.

The header 200 can also include a ground speed sensor 216. The ground speed sensor can be any sensor or device capable of determining ground speed of the combine harvester 100. For example, the ground speed sensor can be a speedometer, a global positioning system (GPS) device, a shaft or motor speed indicator or any other device suitable for measuring a parameter suitable for determining or estimating ground speed. Alternatively, the ground speed can be directly measured, calculated or indirectly measured or determined by the operator. In one exemplary embodiment, the ground speed sensor 216 can be attached to the header or combine harvester and operatively connected to a computer system or the control unit of the harvester, as further discussed below.

The position of the auger hood can be adjusted in part based upon the ground speed of the combine harvester. For example, in the middle of the day, the hood is desirably in a raised position or maximum height to allow more crop material to enter the auger. The higher hood allows for more fluff and crop material to enter the auger for further processing. If the combine harvester is at a high speed, the hood is desirably positioned between about 80% and 90% of the maximum height. In contrast, if the combine harvester is at a low speed, the hood is desirably positioned between about 10% and 20% of the maximum height. As such, if the maximum height of the hood in the raised position is 20 inches, the hood would be between about 16 and 18 inches when the combine harvester is at a high speed and between about 2 and 4 inches when the combine harvester is at a low speed.

Further, while the present invention utilizes moisture sensors and/or the measured ground speed of the combine harvester as parameters for adjusting the hood between a plurality of positions, other parameters may be utilized for determining the plurality of positions of the hood. For example, the plurality of positions of the hood can be determined and based on values set by the operator, immediate past ground contour measurements, a GPS elevation map of a particular field, time of day or any other or combination of user defined inputs.

The control unit 118 can be, for example, a computer which can include a microprocessor based circuit. The control unit 118 may include one or more processors, computer readable memories locally or remotely e.g., cloud based, input/output modules, and other common components. Advantageously, the control unit 118 is integrated with the combine harvester 100, however the control unit can alternatively be configured as a control unit 218 integrated with the header 200.

In accordance with an exemplary embodiment of the present invention, the control unit 118 is operatively connected to the header 200, the plurality of sensors 214 and the ground speed sensor 216. The control unit 118 includes or is operatively associated with a non-transitory computer readable medium having stored thereon computer instructions that, when executed by a processor, such as the control unit 118 cause operational movement of the hood segment 210A. The computer instructions when executed cause the hood segment 210A to be adjusted between a lowered, raised and intermediate position based upon moisture readings of the plurality of sensors 214 and/or a measured ground speed of travel of the combine harvester 100. The control unit 118 receives feedback signals from the one or more sensors and determines a desired position of the hood segment 210A for efficient harvesting operations. The control unit 118 is operatively connected to and in communication with the drive mechanism 208A e.g., the actuator, and the pivot mechanism 212A for raising and lowering the hood segment 210A. Upon determining whether to lower the hood segment 210A to a lowered, raised or intermediate position, the control unit 118 automatically adjusts the hood segment to the determined position. As further discussed below, the control unit determines the position of the hood segment based on the moisture level and/or ground speed of travel detected during the harvesting operation. Alternatively, the control unit can be integrated with the header 200 of the combine harvester 100 and configured to operate the same as for control unit 218.

As discussed above, the control unit 118 contains computer instructions for positioning and adjusting the hood segment 210A between the lowered, raised and intermediate positions. Prior to placing the combine harvester 100 into operation, the operator can input into the control unit 118 predetermined positions for the hood segment based on predetermined variables. Additionally, the operator may modify the predetermined positions to better suit his or her needs. The position of the hood segment is based upon the type of crop being harvested, the moisture readings from the sensors and the time of day. The operator can also pre-select or pre-determine positions for the hood segment for his or her desired mode of operation relative to a particular crop being harvested. The hood segment is desirably positioned at a distance from the auger optimal for reducing grain loss and improving harvesting efficiency.

In accordance with another exemplary embodiment of the present invention, the predetermined positions for the hood segment 210A, e.g., lowered, raised and intermediate, each correlate to a predetermined range of moisture levels and/or a predetermined range of ground speeds. Generally, as moisture increases, the height of the hood segment decreases. Similarly, as moisture decreases, the height of the hood segment increases. Prior to placing the combine harvester 100 into operation, the operator inputs into the control unit 118 the predetermined range of moisture levels and ground speeds that correlate to each of the predetermined positions of the hood segment. Additionally, the operator may modify the predetermined range of moisture levels and ground speeds based upon the type of crop being harvested.

Although the present invention has been discussed with predetermined positions for the hood segment 210A including lowered, raised and intermediate positions, it is to be understood that the hood segment 210A can be positioned along a continuous spectrum of positions or angles relative to the auger. For example, the predetermined positions of the hood segment 210A may include multiple positions between the lowered and intermediate positions and between the intermediate and raised positions. Additionally, a formulistic approach for determining the hood segment 210A position may be utilized wherein moisture readings and/or ground speed correlate to a determined angle of the hood segment relative to a surface of the auger.

When the combine harvester is placed into operation, the sensors at a plurality of positions along the header measure moisture readings of the crops along the width-wise direction of the header. Additionally, a ground speed of the combine harvester is measured e.g., via the ground speed sensor. The moisture readings and ground speed of the combine harvester are then communicated to the control unit. Based upon these values, the control unit determines the optimal position for the hood segment 210A e.g., the control unit determines which position to move the hood segment. Specifically, the measured moisture readings and ground speed are compared to the predetermined range of moisture levels and ground speeds.

For example, the raised position of the hood segment 210A correlates to a first moisture level range and first ground speed range. Similarly, the intermediate position of the hood segment 210A correlates to a second moisture level range and second ground speed range. Finally, the lowered position of the hood segment 210A correlates to a third moisture level range and third ground speed range. The moisture level ranges and ground speed ranges can be set as predetermined default values or adjusted accordingly based on operator preference, the type of crop being harvested, the type of combine harvester, the time of day and the specific contour of the field being harvested.

Thus, in operation, if the measured moisture reading value falls within the first moisture level range, the computer is configured to move the hood segment to the raised position. If the measured moisture reading value falls within the second moisture level range, the computer is configured to move the hood segment to the intermediate position. If the measured moisture reading value falls within the third moisture level range, the computer is configured to move the hood segment to the lowered position. Similarly, the hood segment is moved to the raised, intermediate or lowered position based on whether the measured ground speed value falls within the first ground speed range, second ground speed range or third ground speed range, or in combination with the measured moisture values. During a single harvesting session, the hood segment position can be adjusted according to either moisture level readings, measured ground speeds and/or a combination of both based on operator preference.

Figure 3:
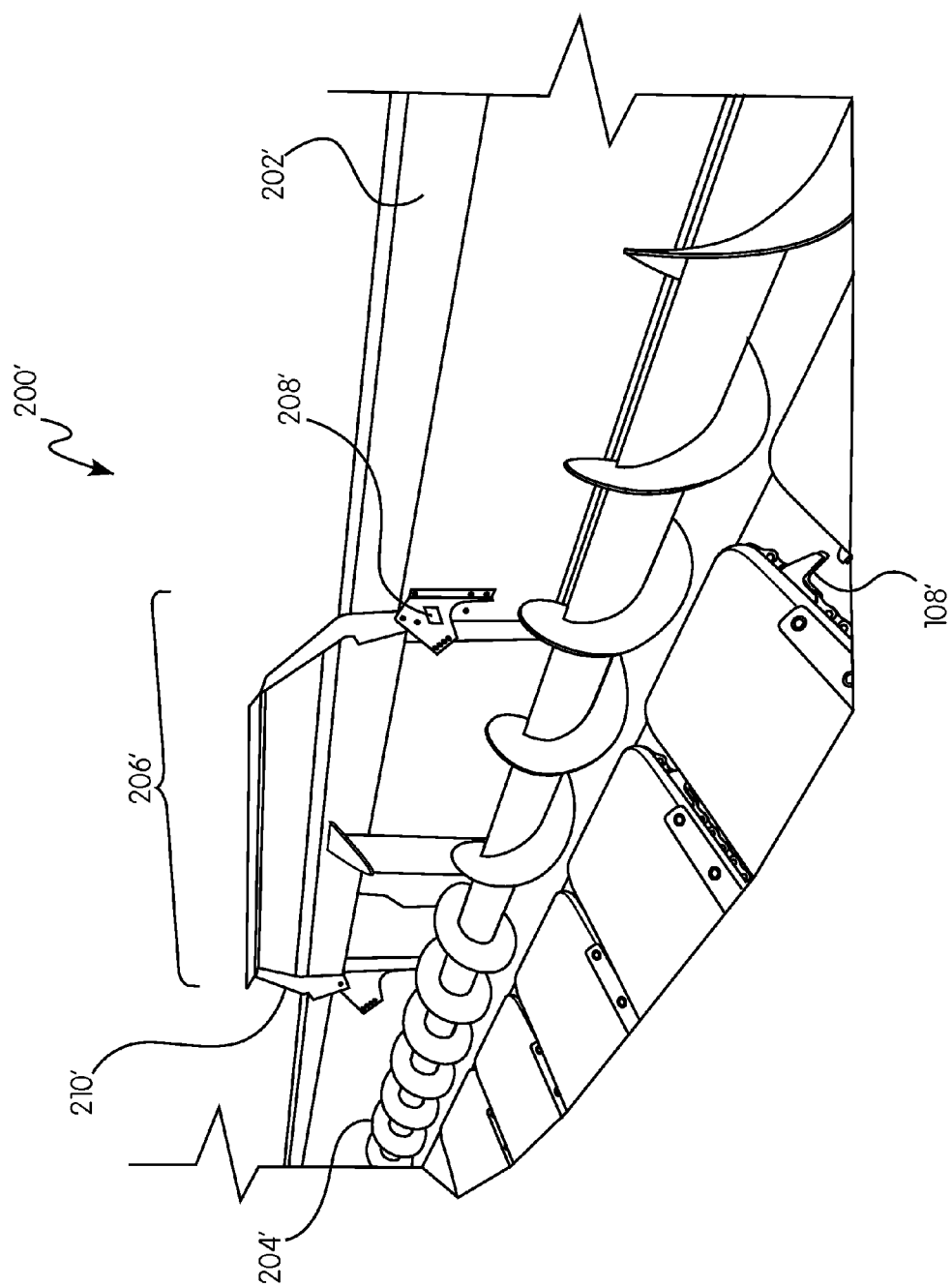
FIG. 3 is a partial perspective view of an adjustable auger hood in accordance with an exemplary embodiment of the present invention in a raised position.
Figure 4:
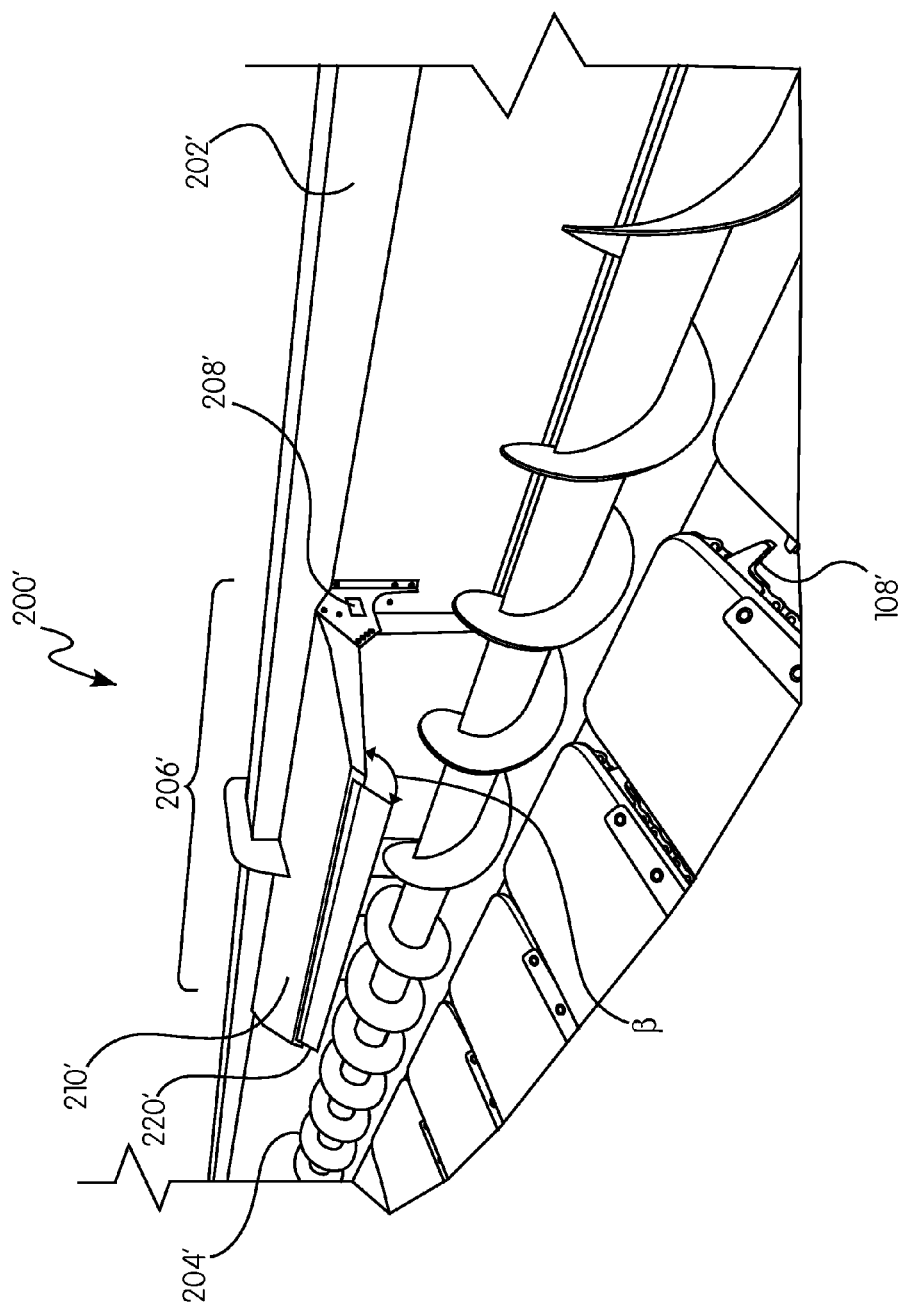
FIG. 4 is a partial perspective view of the adjustable auger hood of FIG. 3 in a lowered position in accordance with an exemplary embodiment of the present invention.
Figure 5:
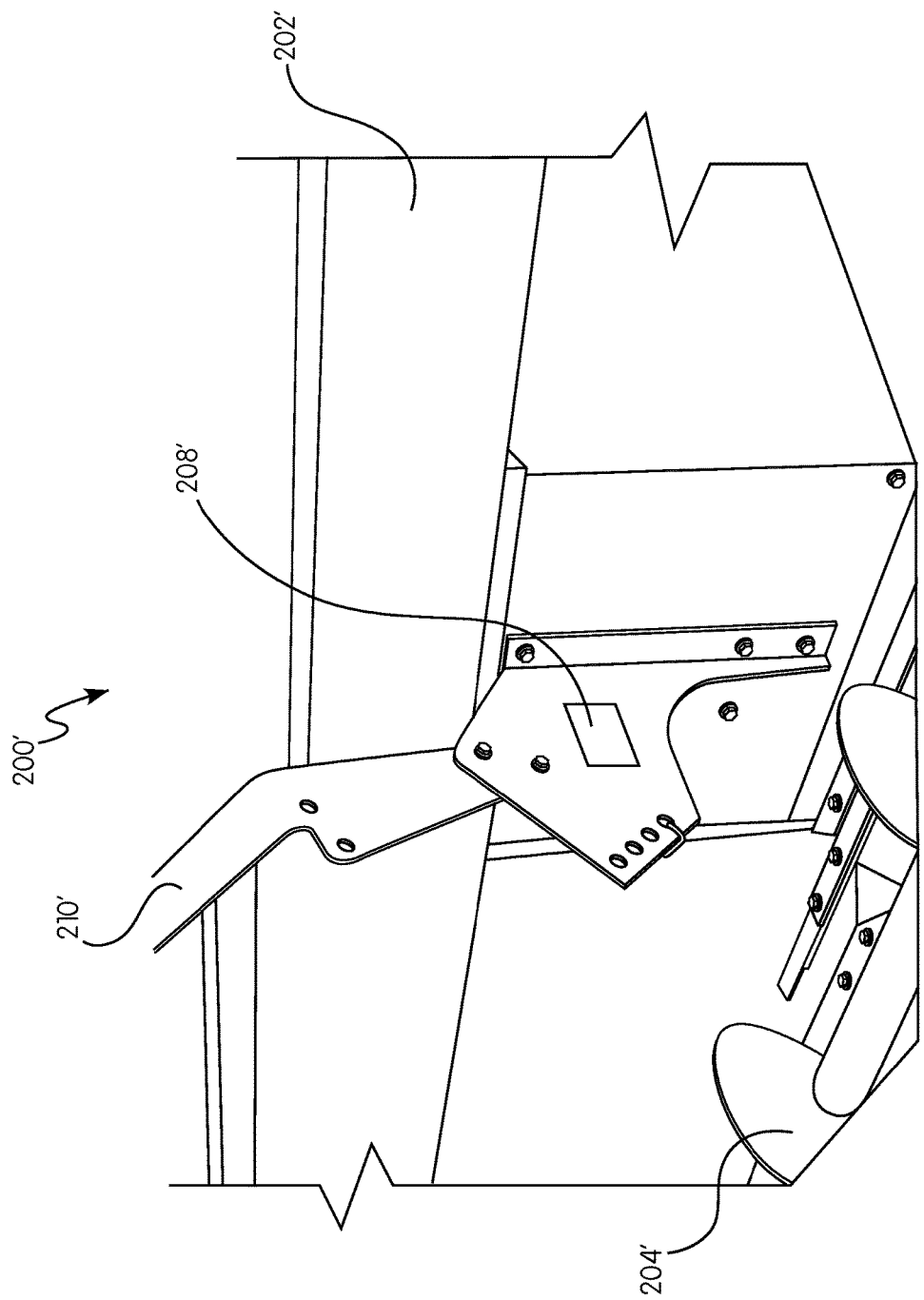
FIG. 5 is an enlarged partial perspective view of a drive mechanism of the adjustable auger hood of FIG. 3 in accordance with an exemplary embodiment of the present invention.

Referring now to FIGS. 3-5, there is illustrated an exemplary embodiment of a header 200' of an agricultural harvester in accordance with another exemplary embodiment of the present invention. The header 200' includes a plurality of row units 108', a frame 202' for mounting to a forward end of the combine harvester, an auger 204' extending lengthwise across the frame 202', and a hood assembly 206' connected to the frame 202' of the header. The hood assembly 206' includes a hood 210' extending above the auger 204' and a drive mechanism 208' for moving the hood 210' between various positions e.g., a first position and a second position. For example, the hood 210' can be moved to a raised position (FIG. 3) and a lowered position (FIG. 4). FIG. 5 illustrates an enlarged perspective view of the drive mechanism 208' of FIGS. 3 and 4.

In accordance with another exemplary embodiment of the present invention, as shown in FIG. 3A, the hood assembly 206' is one of a plurality of hood assemblies 206A', 206B', 206C' that can be connected to the frame 202' of the header. Each hood assembly 206A', 206B', 206C' includes a hood segment 210A', 210B', 210C' extending above the auger 204' and a respective drive mechanism 208A', 208B', 208C' for moving each hood segment 210A', 210B', 210C' between various positions e.g., a first position and a second position. Each of the hood segments 210A', 210B', 210C' of the plurality of hood assemblies 206A', 206B', 206C' may be independently positionable relative to each other.

For purposes of illustration, FIGS. 3, 4 and 5 only illustrate a single hood assembly 206' along a center portion of the header frame 202'. As described above, multiple hood assemblies 206A', 206B', 206C' can be used along the length of the entire header frame 202'.

Referring now to FIG. 4, the hood 210' optionally includes an extension member 220' extending along a distal edge of the hood 210'. The extension member 220' is designed to increase the surface area of the hood 210' covering the auger 204'. Specifically, the extension member 220' improves grain retention and prevents loose kernels from leaving the header by providing additional coverage of the auger 204' during harvesting operations. The extension member 220' can be configured to extend out from the edge of the hood 210' at an obtuse angle β of about 100-160 degrees relative to a bottom surface of the hood 210', thereby forming a structure having a substantially curved longitudinal cross-section having a downwardly depending anterior portion.

The extension member 220' is configured as a rectangular extension member with multiple apertures designed to receive suitable fasteners, e.g., pins, nails, bolts, to affix the extension member 220' to the hood 210'. Alternatively, the extension member 220' can be configured with any other shape suitable for its intended purpose, such as a square, circle and the like. The extension member 220' can be formed of a flexible material such as rubber, reinforced polyester/nylon composite or any other suitable flexible material known in the art.

During harvesting operations, plant stalks are pulled downward and ears of corn continuously stripped. As such, plants may bend, fold, or collide with various parts of the header 200 including the hoods of the plurality of row units 108A-D. As a result, some plants bend and snap such that ears can be lost when the stalks are pulled into the header. These occurrences are more frequent during certain parts of the day due to moisture.

To limit or prevent such loss of corn stalk as well as reduce accreting and build-up in parts of the harvester, the hood segment 210A of the present invention is positioned above the auger 204 to improve grain retention of crop material in the header. Specifically, the hood segment 210A provides a barrier or shield for deflecting and/or guiding loose corn ears and kernels back into the header. Based on moisture readings from sensors 214 and ground speed sensor 216, the position of the hood segment 210A is automatically adjusted to an optimal position based on real time harvesting conditions. This is accomplished by moving the hood segment 210A e.g., to a plurality of positions including first and second positions as well as lowered, raised, or intermediate positions. As a result, grain retention is improved by automatically adjusting the hood segment 210A during harvesting operations without substantial interruption. The adjustment of the hood segment 210A increases the efficiency of the harvester by reducing accretions that may otherwise clog or cause pooling in the combine harvester 100.

It is to be understood that the combine harvester 100 and header 200, 200' include additional components, other than the components discussed above. Such components of the combine harvester 100 and harvesting operations are known and therefore a detailed description of their structure, function and operation is not necessary for a complete understanding of the present embodiment. However, components of the combine harvester and harvesting operations applicable to exemplary embodiments of the present invention are disclosed in U.S. Pat. Nos. 3,808,783 and 3,759,021, the entire disclosures of which are incorporated by reference herein for all purposes.

While the present invention has been described with reference to exemplary embodiments, it will be appreciated by those skilled in the art that various changes may be made and equivalents may be substituted for elements thereof without departing from the scope of the present invention. In addition, modifications may be made to adapt a particular situation or material to the teachings of the present invention without departing from the essential scope thereof. It is to be understood, therefore, that the present invention not be limited to the particular aspects disclosed, but it is intended to cover modifications within the spirit and scope of the present invention as defined by the appended claims.

I claim:

1. A header of a combine harvester comprising:
   an auger for directing the movement of harvested grain toward a feederhouse of the combine harvester; and
   an adjustable hood positioned above the auger covering a width of the auger along its anterior posterior direction and moveable between a lowered position, a raised position and an intermediate position between the lowered and raised positions, the adjustable hood including:
   a pivot mechanism, and
   an actuator for moving the adjustable hood between the lowered, raised and intermediate positions.

2. The header of claim 1, wherein the adjustable hood comprises a plurality of hood segments each independently and operatively connected to a respective actuator.

3. The header of claim 1, wherein the actuator is in communication with a control unit for remotely controlling the adjustable hood between the lowered, raised and intermediate positions.

4. The header of claim 3, wherein the control unit is configured to automatically position the adjustable hood based on a harvesting speed.

5. The header of claim 3, further comprising a sensor in communication with the control unit, and wherein the control unit is configured to automatically position the adjustable hood based on feedback from the sensor.

6. The header of claim 5, wherein the sensor is a moisture sensor and the control unit is configured to position the adjustable hood based on a sensed moisture reading.

7. The header of claim 1, wherein the adjustable hood covers an entirety of the auger.

8. A header of a combine harvester comprising:
   a frame for attaching to the combine harvester;
   an auger extending widthwise of the frame; and
   a hood assembly connected to the frame, the hood assembly including:
   a hood extending above the auger covering a width of the auger along a direction transverse to a longitudinal axis of the auger and movably connected to the frame, and
   a drive mechanism for moving the hood between a first position and a second position.

9. The header of claim 8, wherein the hood assembly is in communication with a control unit for remotely controlling a position of the hood.

10. The header of claim 8, wherein the drive mechanism is positioned about a lateral side of the hood assembly, or about a lateral side of the frame.

11. The header of claim 8, wherein the drive mechanism is an actuator or a motor.

12. The header of claim 8, wherein the hood comprises a plurality of hood segments each independently and operatively connected to a respective drive mechanism.

13. The header of claim 8, wherein the hood assembly covers an entirety of the auger.

14. A combine harvester comprising:
    a control unit; and
    a header that includes:
    a frame for attaching to the harvester,
    an auger extending widthwise of the frame, and
    a hood assembly connected to the frame, the hood assembly including:
    a hood extending over and covering an entire longitudinal cross-sectional length of the auger, and
    a drive mechanism for moving the hood between a first position and a second position, wherein the hood assembly is in communication with the control unit for remotely controlling a position of the hood.

15. The harvester of claim 14, wherein the drive mechanism is positioned about a lateral side of the hood assembly, or about a lateral side of the frame.

16. The harvester of claim 14, wherein the drive mechanism is an actuator or a motor.

17. The harvester of claim 14, further comprising a sensor in communication with the control unit, and wherein the control unit is configured to automatically position the hood based on feedback from the sensor.

18. The harvester of claim 17, wherein the sensor is a moisture sensor and the control unit is configured to position the hood based on a sensed moisture reading.

19. The harvester of claim 14, wherein the hood comprises a plurality of hood segments each operatively connected to a respective drive mechanism.

20. The harvester of claim 19, wherein each of the plurality of hood segments is independently positionable relative to each other.

* * * * *